(12) United States Patent
Sato et al.

(10) Patent No.: US 6,781,080 B1
(45) Date of Patent: Aug. 24, 2004

(54) WIRE ELECTRIC DISCHARGE MACHINE WITH STORED DISCHARGE ENERGY THRESHOLD FUNCTION

(75) Inventors: Tatsushi Sato, Tokyo (JP); Hidetaka Miyake, Tokyo (JP); Seiji Satou, Tokyo (JP); Yoshikazu Ukai, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 6 days.

(21) Appl. No.: 10/149,578
(22) PCT Filed: Oct. 20, 2000
(86) PCT No.: PCT/JP00/07333
§ 371 (c)(1), (2), (4) Date: Jun. 13, 2002
(87) PCT Pub. No.: WO02/34443
PCT Pub. Date: May 2, 2002

(51) Int. Cl.[7] .............................. B23H 7/04; B23H 7/20
(52) U.S. Cl. ................... 219/69.12; 219/69.13
(58) Field of Search .................... 219/69.12, 69.13, 219/69.18

(56) References Cited

U.S. PATENT DOCUMENTS 4,970,363 A * 11/1990 Obara ...................... 219/69.12
5,756,954 A * 5/1998 Kamiguchi et al. ........ 219/69.12
5,756,956 A * 5/1998 Sato et al. ................. 219/69.18

FOREIGN PATENT DOCUMENTS

| JP | 3-26417 A | * | 2/1991 |
|---|---|---|---|
| JP | 7-32219 | | 2/1995 |
| JP | 7-32220 | | 2/1995 |
| JP | 7-32221 | | 2/1995 |
| JP | 7-32222 | | 2/1995 |
| JP | 8-39356 | | 2/1996 |
| JP | 2571077 | | 10/1996 |
| JP | 2891301 | | 2/1999 |
| JP | 2000-84743 | | 3/2000 |

* cited by examiner

Primary Examiner—Geoffrey S. Evans
(74) Attorney, Agent, or Firm—Sughrue Mion, PLLC

(57) ABSTRACT

A wire electric discharge machine includes storage means for storing threshold value data found from a relation between the normal electric discharge pulse energy and the electric discharge machining energy setting value corresponding to various electric discharge machining conditions; and a controller for controlling the electric discharge machining energy setting value so that the threshold value data can approach an operation point at which wire breakage occurs.

7 Claims, 6 Drawing Sheets

WIRE ELECTRIC DISCHARGE MACHINE WITH STORED DISCHARGE ENERGY THRESHOLD FUNCTION

This application is a 371 of PCT/JP00/07333, filed Oct. 20, 2000.

TECHNICAL FIELD

The present invention relates to improvements in a wire electric discharge machine in which a workpiece is machined by electric discharge generated between a wire electrode and the workpiece.

BACKGROUND ART

In wire electric discharge machining, a workpiece is machined by electric discharge generated when electric discharge energy is supplied between a wire electrode and the workpiece. A rate of electric discharge machining is approximately proportional to an intensity of electric discharge energy supplied between the wire electrode and the workpiece. In order to enhance the rate of electric discharge machining, it is necessary to supply electric discharge energy, the intensity of which is as high as possible, however, when the intensity of supplied energy is too high, breaking of the wire is caused, and it becomes necessary to connect the wire electrode again. As a result, the productivity of electric discharge machining is remarkably impaired.

Accordingly, in order to enhance the productivity of electric discharge machining of a wire electric discharge machine, it is necessary to input electric discharge energy, the intensity of which is as high as possible, while the intensity of electric discharge energy to be inputted is restricted in a range so that breaking the wire is not caused.

FIG. 6 is a schematic illustration showing an arrangement of a conventional wire electric discharge machine. For example, this arrangement is the same as that disclosed in Japanese Unexamined Patent Publication No. 62-19322. In FIG. 6, reference numeral 1 is a wire electrode, reference numeral 2 is a workpiece, reference numeral 3 is a wire bobbin, reference numerals 4a and 4b are flushing nozzles of dielectric fluid, reference numeral 5 is a capstan roller, reference numeral 6 is a pinch roller, reference numeral 7 is an X-table for driving the workpiece 2 in the horizontal direction (X-direction), reference numeral 8 is a Y-table for driving the workpiece 2 in the horizontal direction (Y-direction), reference numeral 9 is an X-axis servo amplifier for controlling a drive motor not shown for driving the X-table 7, reference numeral 10 is a Y-axis servo amplifier for controlling a drive motor not shown for driving the Y-table 8, reference numeral 11 is an electric power source used for electric discharge machining, reference numeral 12 is an electric discharge generation detecting means, reference numeral 13 is a pulse control means, reference numeral 14 is a calculation means, reference numeral 15 is a comparison means, and reference numeral 16 is a control means.

Next, operation will be explained below. The wire electrode 1 is held and drawn by the capstan roller 5 and pinch roller 6 so that the wire electrode 1 is made to travel. While dielectric fluid is being supplied in the working gap composed of the wire electrode 1 and the workpiece 2 from the flushing nozzles of dielectric fluid 4a, 4b, electric power for electric discharge machining, which is electric discharge energy, is supplied in the working gap from the electric power source 11 used for machining, and the wire electrode 1 and the workpiece 2 are moved relatively with each other by the X-table 7 and the Y-table 8 which are positioning means, so that the workpiece 2 can be machined by electric discharge. Positioning control for controlling the relative positions of the wire electrode 1 and the workpiece 2 conducted by the positioning means is governed by the control means 16, and also control of electric conditions conducted by the pulse control means 13 is also governed by the control means 16.

The electric power source 11 used for electric discharge machining applies a pulse-like voltage between the wire electrode 1 and the workpiece 2 according to control conducted by the pulse control means 13. The electric discharge generation detecting means 12 outputs a detection signal into the pulse control means 13 when electric discharge is generated between the wire electrode 1 and the workpiece 2. The pulse control means 13 stops supplying an electric current to the wire electrode 1 from the electric power source 11 used for machining after a predetermined period of time (pulse width) has passed from the input of a detection signal from the electric discharge generation detecting means 12. The calculation means 14 is inputted with a signal proportional to the pulse width from the pulse control means 13 and calculates its square. The thus calculated value is made to be an average machining electric current value. The comparison means 15 compares this average machining electric current value with an electric current limit which has been previously set as the maximum electric current value in a range in which wire breakage is not caused in the wire electrode 1. In the case where the average machining electric current value exceeds the electric current limit, the pulse control means 13 is controlled so that the average machining electric current value can not be higher than the electric current limit.

The conventional wire electric discharge machine is composed as described above, and the supply of a machining electric current is suppressed, the intensity of which is higher than that of the electric current limit which has been previously set as the maximum electric current in a range in which wire breakage is not caused. In this way, breaking of the wire is prevented in the wire electrode 1.

However, in the prior art described above, it is a problem how to determine the electric current limit. For example, it is obvious that it is harder to break the wire in a case in which the flushing nozzles of dielectric fluid 4a, 4b are arranged close to the workpiece 2 than in a case in which the flushing nozzles of dielectric fluid 4a, 4b are arranged distant from the workpiece 2. However, the conventional wire electric discharge machine does not distinguish a difference of the electric current limit caused by a difference in the relative position of the dielectric fluid nozzle with the workpiece described above.

Accordingly, the conventional wire electric discharge machine can not accurately control to avoid breaking the wire electrode by setting the electric current limit on the assumption that the relative position of the dielectric fluid nozzle with the workpiece is the same in the whole machining process. Therefore, in the case of machining a workpiece which is partly distant from the flushing nozzles, for example, in the case of machining across a counter bored hole which can be frequently seen in a die, if electric discharge clergy is supplied on the assumption that the dielectric fluid nozzle is arranged close to the workpiece, the breakage of the wire electrode is caused when a portion distant from the dielectric fluid nozzle is machined by electric discharge. If electric discharge energy is supplied on the assumption that the dielectric fluid nozzle is distant from the workpiece, it is impossible to obtain a sufficiently high rate of machining. The above problems may be encountered in the prior art.

When an end face or a step portion is machined by electric discharge, electric discharge is intermittently generated in many cases. Therefore, in the case of machining the end face or the step portion, it is necessary to reduce an intensity of electric discharge energy compared with a case in which machining is normally conducted. As described before, in the prior art, the electric current limit is set at a constant value which has been previously set before conducting electric discharge machining. When the electric current limit is set on the basis of the normal electric discharge machining condition, breakage of the wire electrode tends to occur in the case of conducting electric discharge machining on the end face or the step portion of the workpiece. When the electric current limit is set on the basis of conducting electric discharge machining on the end face or the step portion of the workpiece, the rate of electric discharge machining is remarkably lowered. The above problems are encountered in the prior art.

DISCLOSURE OF THE INVENTION

The present invention has been accomplished in order to solve the above problems. It is an object of the present invention to provide a wire electric discharge machine characterized in that: even when the relative layout of the nozzles with the workpiece varies or even when an end face or a step portion is subjected to electric discharge machining, the productivity of electric discharge machining can be greatly enhanced.

The present invention provides a wire electric discharge machine for conducting electric discharge machining on a workpiece by electric discharge generated in a working gap formed by a wire electrode and the workpiece by supplying electric discharge from a machining electric power source while a dielectric fluid is being supplied in the working gap formed by the wire electrode and the workpiece from flushing nozzles of dielectric fluid, comprising: normal electric discharge pulse detection means for detecting a normal electric discharge pulse in the working gap; normal electric discharge pulse calculation means for calculating normal electric discharge pulse energy from the detected normal electric discharge pulses; storage means for storing threshold value data in which a predetermined margin is ensured from an operation point at the time of wire breakage found from a relation between the normal electric discharge pulse energy and the electric discharge machining energy setting value corresponding to various electric discharge machining conditions; and control means for controlling the electric discharge machining energy setting value so that the operation point can approach the threshold value data.

The present invention provides a wire electric discharge machine, wherein as a parameter for changing the electric discharge machining energy setting value controlled by the control means, at least one of the parameters for setting an electric discharge frequency such as a pause time and servo reference voltage is used, and the threshold value data are set from a relation between the parameter and the normal electric discharge pulse energy.

The present invention provides a wire electric discharge machine, wherein as a parameter for changing the electric discharge machining energy setting value controlled by the control means, at least one of the parameters for setting electric discharge energy per one pulse such as a peak electric current setting value and a pulse width is used, and the threshold value data are set from a relation between the parameter and the normal electric discharge pulse energy.

The present invention provides a wire electric discharge machine for conducting electric discharge machining on a workpiece by electric discharge generated in a working gap formed by a wire electrode and the workpiece by supplying electric discharge energy from a machining electric power source while a dielectric fluid is being supplied in the working gap formed by the wire electrode and the workpiece from a dielectric fluid nozzle, comprising: normal electric discharge pulse detection means for detecting a normal electric discharge pulse between the electrodes; normal electric discharge pulse counting means for counting the number of normal electric discharge pulses from the detected normal electric discharge pulses; storage means for storing threshold value data in which a predetermined margin is ensured from an operation point at the time of wire breakage found from a relation between the number of normal electric discharge pulses and the pause time setting value corresponding to various electric discharge machining conditions; and control means for controlling the electric discharge machining energy setting value so that the operation point can approach the threshold value data.

The present invention provides a wire electric discharge machine, wherein the electric discharge machining conditions include a difference in a relative position between the electric discharge machining nozzle and the workpiece.

Since the wire electric discharge machine of the present invention is composed as described above, the following effects can be provided. Even when the relative layout of the nozzles with the workpiece varies or even when electric discharge machining is conducted on an end face or step portion of the workpiece, it is possible to supply electric discharge energy, the intensity of which is very close to a critical value where wire breakage occurs. Therefore, it is possible to provide a wire electric discharge machine, the productivity of electric discharge machining of which can be greatly enhanced.

DETAILED DESCRIPTION OF THE PREFERRED EMBODIMENTS

First Embodiment

Figure 1:
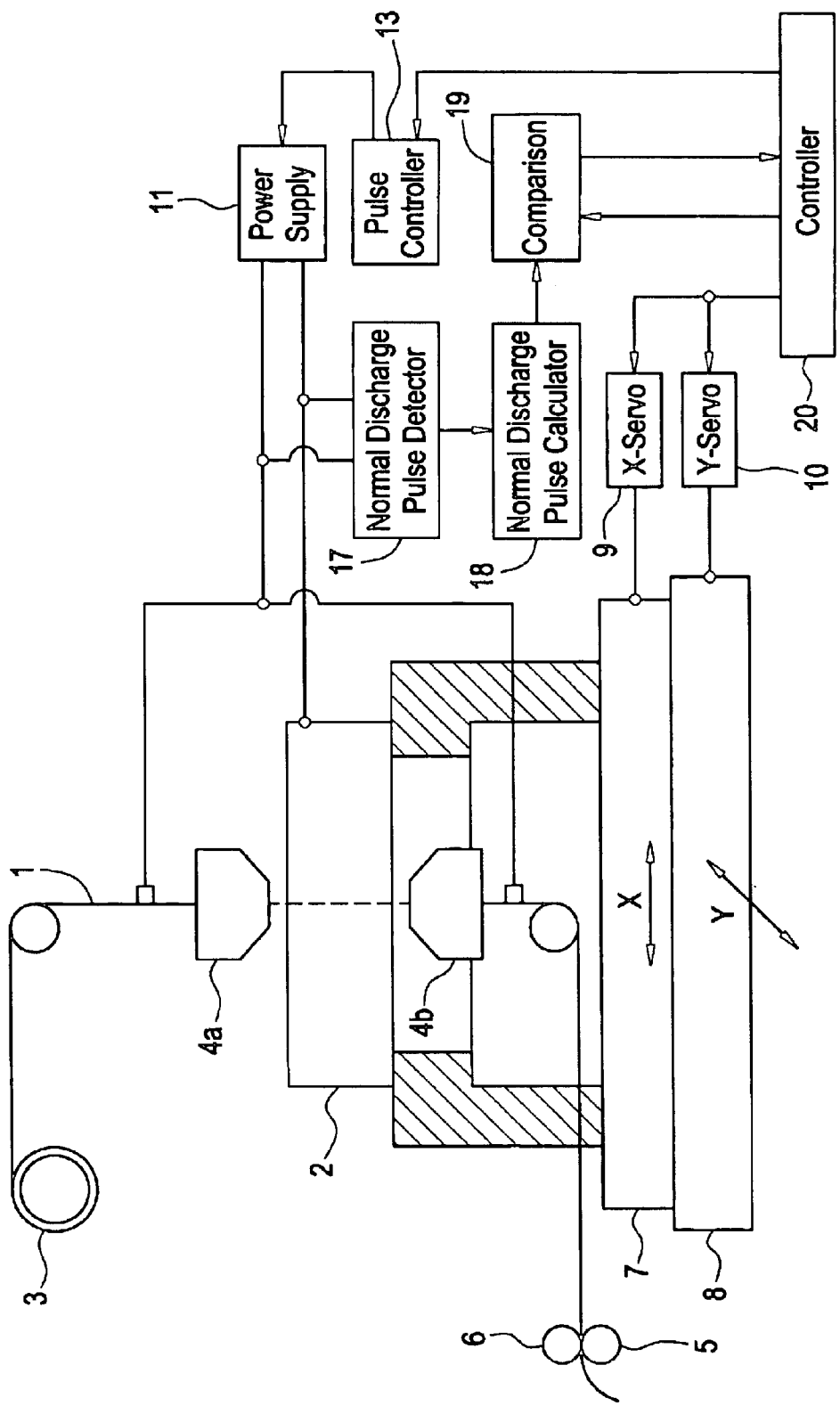
FIG. 1 is a schematic illustration showing an arrangement of a wire electric discharge machine of a First Embodiment of the present invention.

FIG. 1 is a schematic illustration showing an arrangement of a wire electric discharge machine of a First Embodiment of the present invention. In the drawing, reference numeral 1 is a wire electrode, reference numeral 2 is a workpiece, reference numeral 3 is a wire bobbin, reference numerals 4a and 4b are flushing nozzles of dielectric fluid, reference numeral 5 is a capstar roller, reference numeral 6 is a pinch roller, reference numeral 7 is an X-table for driving the workpiece 2 in the horizontal direction (X-direction), reference numeral 8 is a Y-table for driving the workpiece 2 in the horizontal direction (Y-direction), reference numeral 9 is an X-axis servo amplifier for controlling a drive motor not shown for driving the X-table 7, reference numeral 10 is a Y-axis servo amplifier for controlling a drive motor not shown for driving the Y-table 8, reference numeral 11 is an electric power source used for electric discharge machining, reference numeral 13 is a pulse control means, reference numeral 17 is a normal electric discharge pulse detection means, reference numeral 18 is a normal electric discharge pulse calculation means, reference numeral 19 is a comparison means, and reference numeral 20 is a control means.

Next, operation will be explained below. The wire electrode 1 is held and drawn by the capstan roller 5 and pinch roller 6 so that the wire electrode 1 is made to travel. While dielectric fluid is being supplied in the working gap composed of the wire electrode 1 and the workpiece 2 from the flushing nozzles of dielectric fluid 4a, 4b, electric power for electric discharge machining, which is electric discharge energy, the intensity of which changes like a pulse, is supplied in the working gap from the electric power source 11 controlled by the pulse control means 13, and the wire electrode 1 and the workpiece 2 are moved relatively with each other by the X-table 7 and the Y-table 8 which are positioning means, so that the workpiece 2 can be machined by electric discharge. Positioning control for controlling the relative positions of the wire electrode 1 and the workpiece 2 conducted by the positioning means is governed by the control means 20, and also control of electric conditions conducted by the pulse control means 13 is governed by the control means 20.

In this connection, the normal electric discharge pulse is defined as a pulse generated in a good machining condition. The normal electric discharge pulse is characterized in that electric discharge is generated via an ignition delay time of several hundred ns to several $\mu$s after applying voltage. For example, as described in Japanese Patent Publication No. 2-44648, the normal electric discharge pulse can be detected by the occurrence of electric discharge in a predetermined period of time. The normal electric discharge pulse detection means 17 has a detecting function in which the above method is used.

Normal electric discharge pulse energy is defined as electric discharge machining energy in the case of extracting only normal electric discharge pulses. This normal electric discharge pulse energy can be found by the calculation of N·Ipn·Ipn, wherein N is a number of the normal electric discharge pulses measured by the normal electric discharge pulse detection means 17 in unit time, and Ipn is a peak electric current of the normal electric discharge pulse. The normal electric discharge pulse calculation means 18 has a function of conducting the above calculation.

Figure 2:
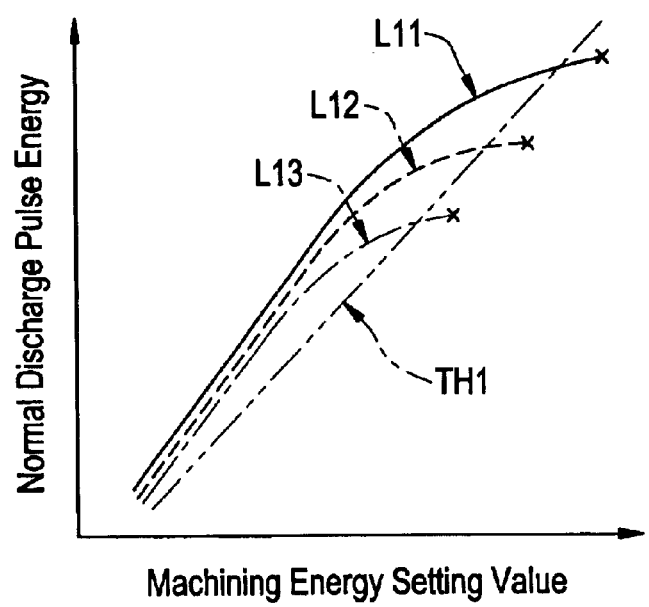
FIG. 2 is a schematic illustration for explaining an electric discharge machining energy setting operation of a wire electric discharge machine of the First Embodiment of the present invention.

FIG. 2 is a schematic illustration for explaining electric discharge machining energy setting operation of a wire electric discharge machine of the First Embodiment of the present invention. FIG. 2 shows a relation between the electric discharge machining energy setting value, which has been set in the electric discharge machine 11 by the control means 20 via the pulse control means 13, and the normal electric discharge pulse energy which has been generated.

In this case, the electric discharge machining energy setting value is the average electric discharge machining energy inputted when electric discharge machining proceeds normally. The electric discharge machining energy setting value is determined by f·Ip·Ip, f·Ip·Ton or f·Ton·Ton, wherein f is an average electric discharge frequency determined by the pause time, which has been set, and by servo reference voltage, Ip is a peak electric current value, and Ton is a pulse width.

FIG. 2 is a view showing an example in which the peak electric current value Ip is fixed and the average electric discharge frequency f is changed. The aforementioned relation between the electric discharge machining energy setting value and the normal electric discharge pulse energy can be also found as follows. While the peak electric current value Ip is fixed in a predetermined section of the electric discharge machining energy setting value, the average electric discharge frequency f is changed, and while the average electric discharge frequency f is fixed in another section, the peak electric current Ip is changed.

In FIG. 2, L11 (solid line) shows a case in which the electric discharge flushing nozzles of dielectric fluid 4a and 4b are arranged close to the workpiece 2 (for example, the electric discharge flushing nozzles of dielectric fluid 4a and 4b are arranged at positions distant from the workpiece 2 by 0.1 mm), L12 (broken line) shows a case in which either flushing nozzle 4a or 4b is arranged distant from the workpiece 2 (for example, the electric discharge dielectric fluid nozzle 4a or 4b is arranged at a position distant from the workpiece 2 by 5 mm to 10 mm), and L13 (one-dotted chain line) shows a case in which both of the flushing nozzles 4a and 4b are arranged distant from the workpiece 2 (for example, the electric discharge flushing nozzles of dielectric fluid 4a and 4b are arranged at positions distant from the workpiece 2 by 5 mm to 10 mm). In the drawing, reference mark x shows an operation point where the wire electrode is broken. In the drawing, TH1 (two-dotted chain line) shows a threshold value curve which has been set with some margin from the operation point where wire breakage occurs is ensured.

The present inventors made a large number of experiments in which a relative position of the electric discharge dielectric fluid nozzle with the workpiece was variously changed. As a result, the present inventors found that the characteristic shown in FIG. 2 generally exists between the electric discharge machining energy setting value and the measured normal electric discharge pulse energy according to a difference of the relative position of the electric discharge dielectric fluid nozzle with the workpiece. That is, the present inventors found the following. When the axis abscissa represents an electric discharge machining energy setting value which has been set in the electric discharge machining electric power source 11 by the control means 20 via the pulse control means 13 and the ordinate represents normal electric discharge pulse energy which has been measured, the operation point is defined in FIG. 2. As the electric discharge machining energy setting value is increased, this operation point is moved from bottom to top on the locus of L11, L12 or L13 according to a difference in the relative position of the electric discharge dielectric fluid nozzle of L11, L12 and L13 with the workpiece, and the wire electrode is broken at point x which is located at an upper end of each locus.

Pulses except for the normal electric discharge pulse seldom contribute to electric discharge machining, that is, a rate of electric discharge machining is substantially governed by normal electric discharge pulse energy. Therefore, when electric discharge machining is conducted at the operation point immediately before the breaking of the wire (The operation point at the point of breaking of wire is expressed by point x in the drawing), it is possible to realize a critical rate of electric discharge machining which is immediately before the breaking of the wire electrode corresponding to a difference in the relative position of the electric discharge dielectric fluid nozzle with the workpiece.

Accordingly, when the threshold value curve of TH1 shown in FIG. 2, in which some margin from the operation point where breakage occurs(X) is ensured, is set and the operation point is kept in the neighborhood of this threshold value curve, it becomes possible to supply a maximum intensity of electric discharge energy in a range in which the wire electrode is not broken wherever the relative position of the electric discharge dielectric fluid nozzle with the workpiece may be located. Therefore, the productivity of electric discharge machining can be greatly enhanced.

The relation between the electric discharge machining energy setting value and the normal electric discharge pulse energy is changed by not only the difference in the relative position of the electric discharge dielectric fluid nozzle with the workpiece but also the electric discharge machining conditions such as the thickness and material of the workpiece and the diameter and material of the wire electrode. Therefore, the following method may be adopted. A relation between the electric discharge machining energy setting value, which corresponds to the various electric discharge machining conditions including the relative position of the electric discharge dielectric fluid nozzle with the workpiece, and the normal electric discharge pulse energy is found by experiments and also the operation point where wire breakage occurs is found by experiments, and threshold value curve data, in which a predetermined margin is ensured from this operation point, are stored, for example, in the storage means provided in the control means 20.

The threshold value curve shown in FIG. 2 is taken as an example and explained below. In the case where the operation point for each electric discharge machining condition is located above the threshold value curve TH1, control is conducted in such a manner that the electric discharge machining energy setting value is increased. In the case where the operation point for each electric discharge machining condition is located below the threshold value curve TH1, control is conducted in such a manner that the electric discharge machining energy setting value is decreased. That is, operation is conducted as follows. The operation point is found by the normal electric discharge pulse energy, which has been found by the normal electric discharge pulse calculation means 18, and by the electric discharge machining energy setting value which has been set by the control means 20. This operation point and the threshold value curve data, which have been set in the control means 20, are compared with each other by the comparison means 19. In the case where this operation point is located above the threshold value curve (that is, in the case where an intensity of normal electric discharge pulse energy at the operation point is higher than an intensity of normal electric discharge pulse energy of the threshold value curve data corresponding to the electric discharge machining energy setting value at the operation point, or in the case where the electric discharge machining energy setting value of the threshold value curve data corresponding to the normal electric discharge pulse energy at the operation point is higher than the electric discharge machining energy setting value at the operation point), the control means 20 sends a command to the pulse control means 13 so that the electric discharge machining energy setting value can be increased. In the case where this operation point is below the threshold value curve (that is, in the case where an intensity of normal electric discharge pulse energy at the operation point is lower than an intensity of normal electric discharge pulse energy of the threshold value curve data corresponding to the electric discharge machining energy setting value at the operation point, or in the case where the electric discharge machining energy setting value of the threshold value curve data corresponding to the normal electric discharge pulse energy at the operation point is lower than the electric discharge machining energy setting value at the operation point), the control means 20 sends a command to the pulse control means 13 so that the electric discharge machining energy setting value can be decreased.

As can be seen in FIG. 2, the higher the electric discharge machining energy setting value is, the higher the threshold value curve TH1 is set. Accordingly, when control is conducted so that the threshold value curve can be made to be close to the operation point, in the case where electric discharge is intermittently generated, the number of generations of normal electric discharge is decreased. Therefore, an intensity of electric discharge energy is automatically set to be low. Consequently, even in a region such as an end face of the workpiece in which electric discharge machining is unstably conducted, control is conducted so that the breakage of the wire can be appropriately prevented.

In the above explanation, the threshold value curve is set to be a continuous function with respect to the electric discharge machining energy setting value, however, no problems are caused even when the threshold value curve is made to be discrete in an appropriate range. For example, the following threshold value curve setting method may be adopted. The electric discharge machining energy setting values are divided into predetermined ranges, and the threshold value curve is set step-like so that the normal electric discharge pulse energy can become constant in the thus divided ranges.

Second Embodiment

Figure 3:
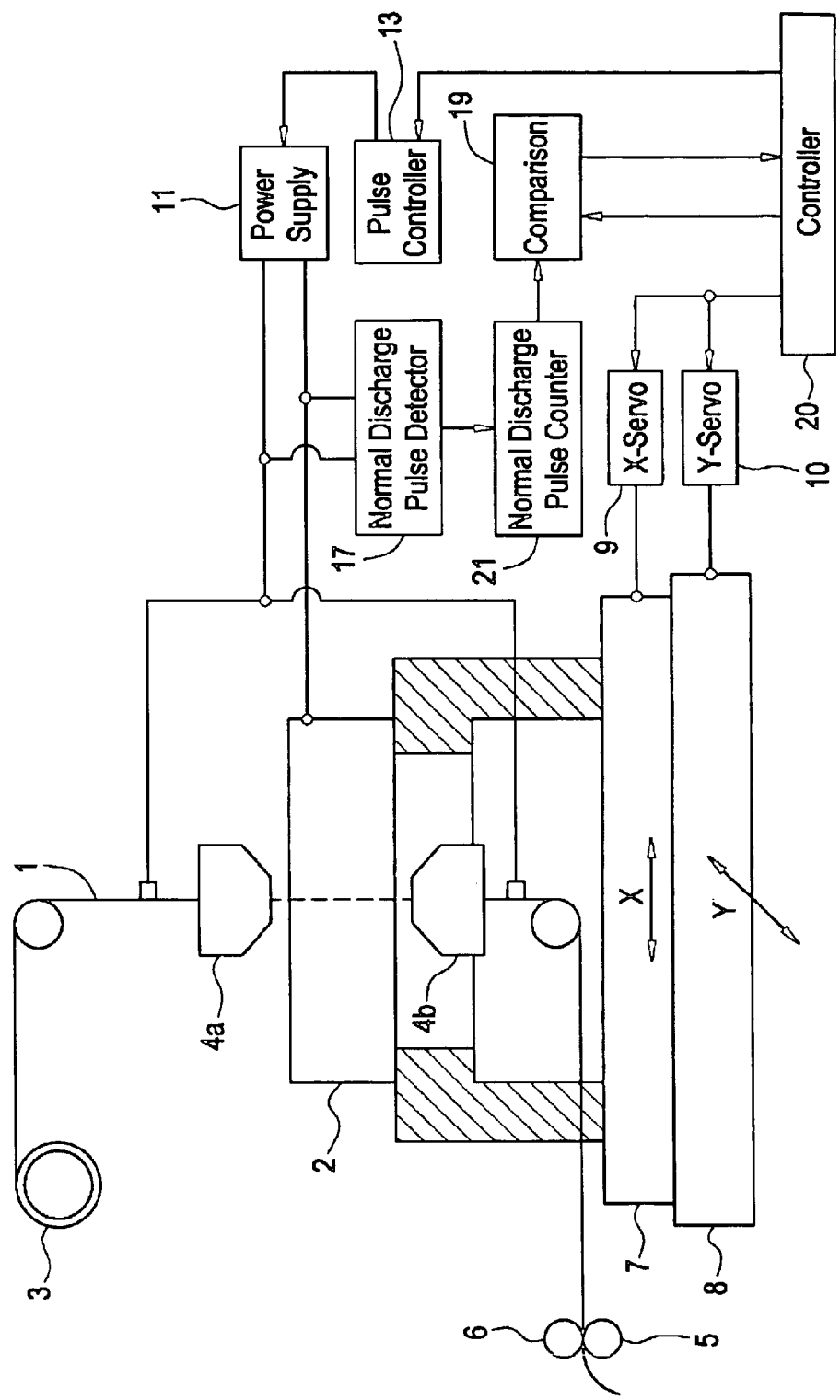
FIG. 3 is a schematic illustration showing an arrangement of a wire electric discharge machine of a Second Embodiment of the present invention.

FIG. 3 is a schematic illustration showing an arrangement of a wire electric discharge machine of a Second Embodiment of the present invention. In the drawing, reference numeral 21 is a normal electric discharge pulse counting means. Like reference characters are used to indicate like parts in FIG. 1 and 3. The basic operation of this embodiment as a wire electric discharge machine is the same as that of the First Embodiment.

Figure 4:
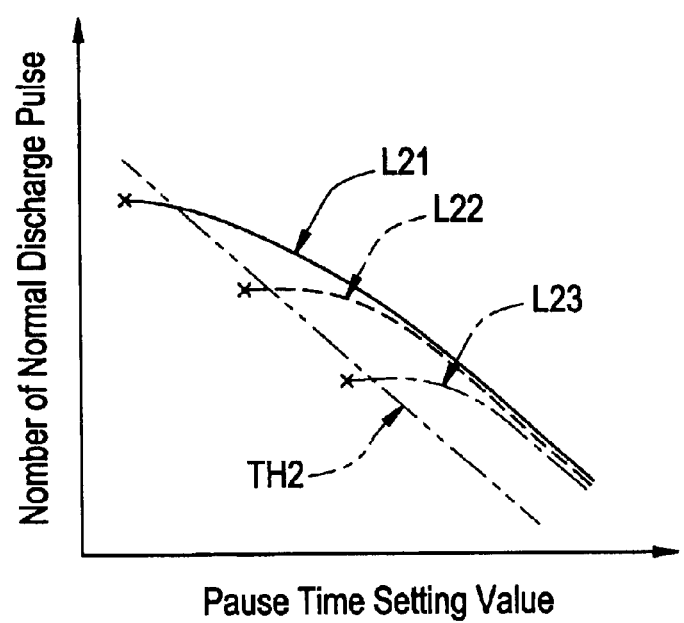
FIG. 4 is a schematic illustration for explaining a pause time setting operation of a wire electric discharge machine of a Second Embodiment of the present invention.

FIG. 4 is a schematic illustration for explaining the pause time setting operation of a wire electric discharge machine of the Second Embodiment of the present invention. FIG. 4 shows a relation between the pause time setting value, which has been set in the electric discharge power source 11 by the control means 20 via the pulse control means 13, and the number of normal electric discharge pulses which have been generated. In the drawing, L21 (solid line) shows a case in which the electric discharge flushing nozzles of dielectric fluid 4a and 4b are both arranged close to the workpiece 2 (for example, the electric discharge flushing nozzles of dielectric fluid 4a and 4b are arranged at positions distant from the workpiece 2 by 0.1 mm), L22 (broken line) shows a case in which the electric discharge dielectric fluid nozzle 4a or 4b is arranged distant from the workpiece 2 (for example, the electric discharge dielectric fluid nozzle 4a or 4b is arranged at a position distant from the workpiece 2 by 5 mm to 10 mm), and L23 (one-dotted chain line) shows a case in which the electric discharge flushing nozzles of dielectric fluid 4a and 4b are arranged distant from the workpiece 2 (for example, the electric discharge flushing nozzles of dielectric fluid 4a and 4b are arranged at positions distant from the workpiece 2 by 5 mm to 10 mm). In the drawing, reference mark x shows an operation point. In the drawing, TH2 (two-dotted chain line) shows a threshold value curve which has been set with some margin from the operation point where wire breakage occurs is ensured.

FIG. 4 shows a case in which only the pause time is adopted as a parameter by which the electric discharge machining energy setting value is changed in FIG. 2 of the First Embodiment. In this case, the peak electric current is made to be constant, and the normal electric discharge pulse energy and the normal electric discharge pulse number can be replaced with each other because both are proportional to each other. Accordingly, in FIG. 4, attention is given to a relation between the pause time setting value and the normal electric discharge pulse number.

Accordingly, in the same manner as that of the First Embodiment shown in FIG. 2, when the threshold value curve of TH2 shown in FIG. 4, in which some margin from the operation point is ensured, is set and the threshold value curve is kept in the neighborhood of this operation point, it becomes possible to supply a maximum intensity of electric discharge energy in a range where the wire electrode is not broken wherever the relative position of the electric discharge dielectric fluid nozzle with the workpiece may be located. Therefore, the productivity of electric discharge machining can be greatly enhanced in the same manner as that of the First Embodiment.

In the same manner as that of the First Embodiment, the threshold value curve data may be stored, for example, in the memory means provided in the control means 20 in such a manner that a relation between the pause time setting value, which corresponds to various electric discharge machining conditions including a relative position of the electric discharge dielectric fluid nozzle with the workpiece, and the normal electric discharge pulse number and the operation point where wire breakage occurs are found by experiments and a predetermined margin is ensured from this operation point.

Explanations are made above into the case in which a threshold value curve is set according to the relation between the pause time setting value and the normal electric discharge pulse number, and the pause time setting value is controlled so that the operation point is close to this threshold value curve. However, instead of the pause time setting value, other parameters for setting the electric discharge frequency such as a command value of the inter-electrode servo voltage may be controlled.

Third Embodiment

FIG. 1 is a schematic illustration showing an arrangement of a wire electric discharge machine of a Third Embodiment of the present invention. Basic operation of the wire electric discharge machine of Third Embodiment is the same as that of First Embodiment.

Figure 5:
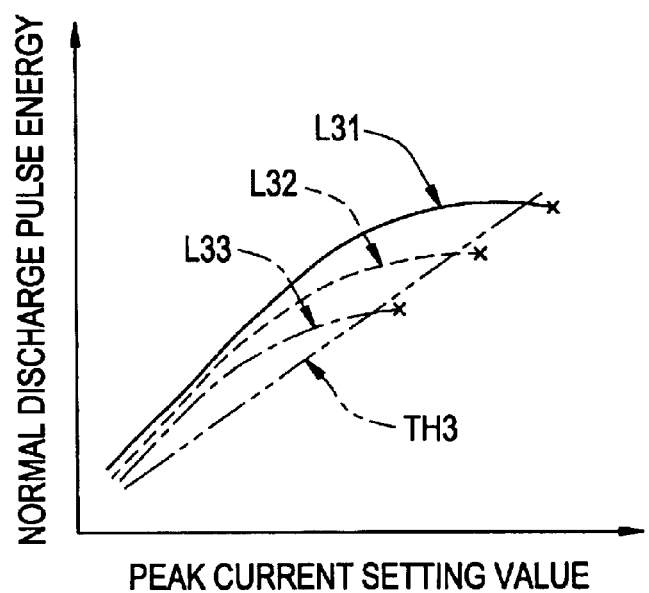
FIG. 5 is a schematic illustration for explaining a peak electric current value setting operation of a wire electric discharge machine of a Third Embodiment of the present invention.
Figure 6:
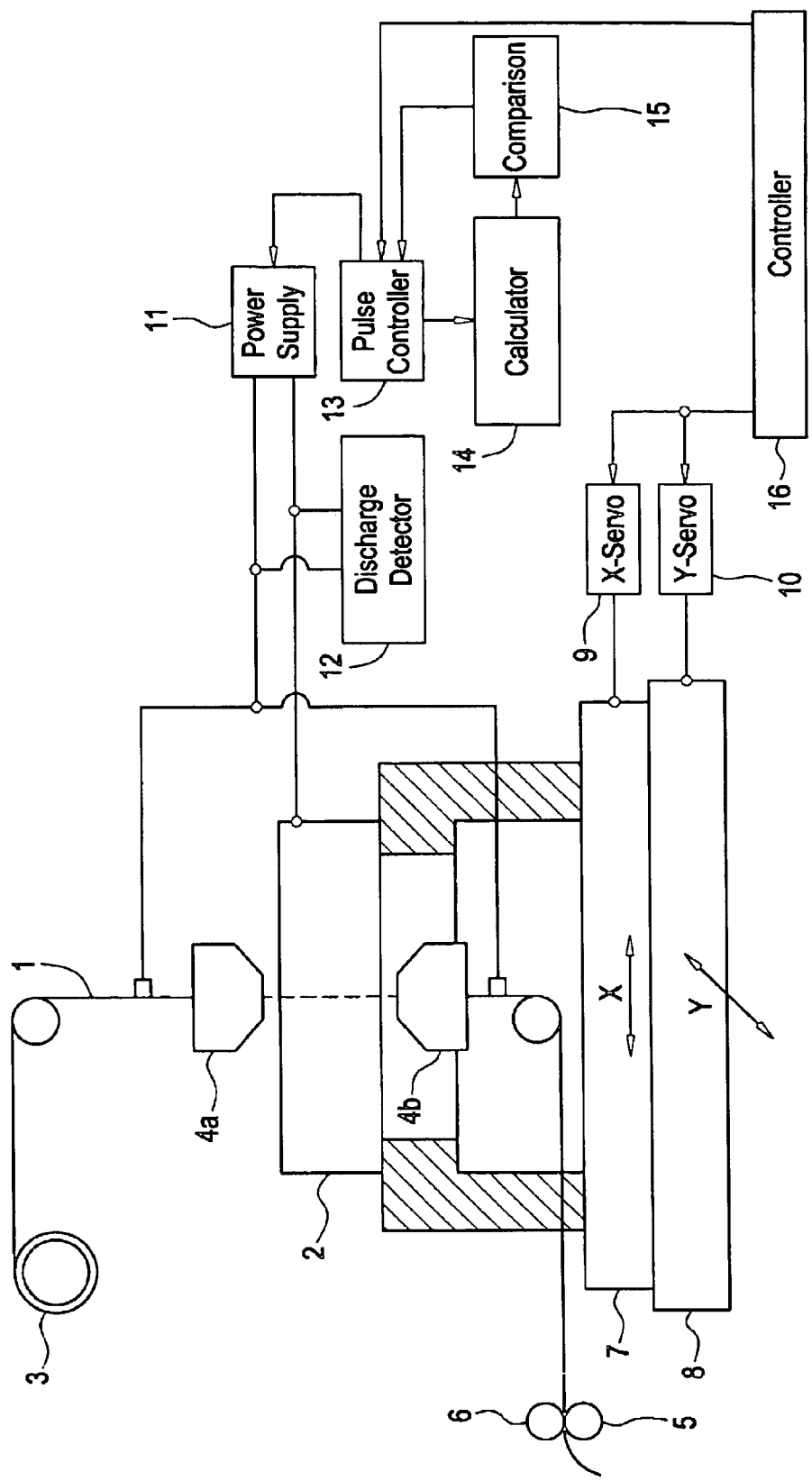
FIG. 6 is a schematic illustration showing an arrangement of a conventional wire electric discharge machine.

FIG. 5 is a schematic illustration for explaining a peak electric current value setting operation of a wire electric discharge machine of the Third Embodiment of the present invention. FIG. 5 shows a relation between the peak electric current setting value, which has been set in the electric discharge machining electric power source 11 by the control means 20 via the pulse control means 13, and the normal electric discharge pulse energy which has been generated.

FIG. 5 shows a case in which only a peak electric current is adopted as a parameter for changing the electric discharge machining energy setting value of the First Embodiment shown in FIG. 2. In FIG. 5, attention is given to a relation between the peak electric current setting value and the normal electric discharge pulse energy.

In FIG. 5, L31 (solid line) shows a case in which the electric discharge flushing nozzles of dielectric fluid 4a and 4b are arranged close to the workpiece 2 (for example, the electric discharge flushing nozzles of dielectric fluid 4a and 4b are arranged at positions distant from the workpiece 2 by 0.1 mm), L32 (broken line) shows a case in which the electric discharge dielectric fluid nozzle 4a or 4b is arranged distant from the workpiece 2 (for example, the electric discharge dielectric fluid nozzle 4a or 4b is arranged at a position distant from the workpiece 2 by 5 mm to 10 mm), and L33 (one-dotted chain line) shows a case in which the electric discharge flushing nozzles of dielectric fluid 4a and 4b are both arranged distant from the workpiece 2 (for example, the electric discharge flushing nozzles of dielectric fluid 4a and 4b are arranged at positions distant from the workpiece 2 by 5 mm to 10 mm). In the drawing, reference mark x shows an operation point where the wire electrode is broken. In the drawing, TH3 (two-dotted chain line) shows a threshold value curve which has been set with some margin from the operation point where breakage of the wire occurs is ensured.

In the same manner as that of the First Embodiment shown in FIG. 2, when the threshold value curve of TH3 shown in FIG. 4, in which some margin from the operation point is ensured, is set and the threshold value curve is kept in the neighborhood of this operation point, it becomes possible to supply a maximum intensity of electric discharge energy in a range where the wire electrode is not broken wherever the relative position of the electric discharge dielectric fluid nozzle with the workpiece may be located. Therefore, the productivity of electric discharge machining can be greatly enhanced in the same manner as that of First Embodiment.

In the same manner as that of the First Embodiment, the threshold value curve data may be stored, for example, in the memory means provided in the control means 20 in such a manner that a relation between the peak electric current setting value, which corresponds to various electric discharge machining conditions including a relative position of the electric discharge dielectric fluid nozzle with the workpiece, and the normal electric discharge pulse energy and the operation point where the wire breaks are found by experiments and a predetermined margin from this operation point of breaking of wire is ensured.

Explanations are made above into the case in which a threshold value curve is set according to the relation between the peak electric current setting value and the normal electric discharge pulse energy, and the peak electric current setting value is controlled so that the threshold value curve can be made to be close to this operation point. However, instead of the peak electric current setting value, other parameters for setting the electric discharge energy per one pulse such as a pulse width may be controlled.

What is claimed is:

1. A wire electric discharge machine for conducting electric discharge machining on a workpiece by electric discharge generated in a working gap formed by a wire electrode and the workpiece by supplying electric discharge from a machining electric power source while a dielectric fluid is being supplied in the working gap formed by the wire electrode and the workpiece from flushing nozzles of dielectric fluid, comprising:

normal electric discharge pulse detection means for detecting a normal electric discharge pulse in the working gap;

normal electric discharge pulse calculation means for calculating normal electric discharge pulse energy from the detected normal electric discharge pulses;

storage means for storing threshold value data in which a predetermined margin is ensured from an operation point when wire breakage occurs, found from a relation between the normal electric discharge pulse energy and the electric discharge machining energy setting value corresponding to various electric discharge machining conditions; and control means for controlling the electric discharge machining energy setting value so that the threshold value data can approach the operation point.

2. The wire electric discharge machine according to claim 1, wherein as a parameter for changing the electric discharge machining energy setting value controlled by the control means, at least one parameter for setting an electric discharge frequency, such as a pause time or servo reference voltage, is used, and the threshold value data are set from a relation between the parameter and the normal electric discharge pulse energy.

3. The wire electric discharge machine according to claim 2, wherein the electric discharge machining conditions include a difference in a relative position between the electric discharge machining nozzle and the workpiece.

4. The wire electric discharge machine according to claim 1, wherein as a parameter for changing the electric discharge machining energy setting value controlled by the control means, at least one parameter for setting electric discharge energy per one pulse, such as a peak electric current setting value or a pulse width, is used, and the threshold value data are set from a relation between the parameter and the normal electric discharge pulse energy.

5. The wire electric discharge machine according to claim 4, wherein the electric discharge machining conditions include a difference in a relative position between the electric discharge machining nozzle and the workpiece.

6. A wire electric discharge machine for conducting electric discharge machining on a workpiece by electric discharge generated in a working gap formed by a wire electrode and the workpiece by supplying electric discharge energy from a machining electric power source while a dielectric fluid is being supplied in the working gap formed by the wire electrode and the workpiece from a dielectric fluid nozzle, comprising:

normal electric discharge pulse detection means for detecting a normal electric discharge pulse in the working gap;

normal electric discharge pulse counting means for counting the number of normal electric discharge pulses from the detected normal electric discharge pulses;

storage means for storing threshold value data in which a predetermined margin is ensured from an operation point when wire breakage occurs, found from a relation between the number of normal electric discharge pulses and the pause time setting value corresponding to various electric discharge machining conditions; and control means for controlling the electric discharge machining energy setting value so that the threshold value data can approach the operation point.

7. The wire electric discharge machine according to claim 6, wherein the electric discharge machining conditions include a difference in a relative position between the electric discharge machining nozzle and the workpiece.

* * * * *

UNITED STATES PATENT AND TRADEMARK OFFICE
CERTIFICATE OF CORRECTION

PATENT NO. : 6,781,080 B1
DATED : August 24, 2004
INVENTOR(S) : Tatsushi Sato et al.

It is certified that error appears in the above-identified patent and that said Letters Patent is hereby corrected as shown below:

Column 11,
Lines 12-13, delete "the threshold value data" and insert -- operation point --;
Line 12, delete "operation point" and insert -- threshold value data --.

Column 12,
Lines 26-27, delete "the threshold value data" and insert -- operation point --;
Line 27, delete "operation point" and insert -- threshold value data --.

Signed and Sealed this

Fourteenth Day of June, 2005

JON W. DUDAS
*Director of the United States Patent and Trademark Office*